United States Patent [19]

Naarmann et al.

[11] 4,359,563
[45] Nov. 16, 1982

[54] PREPARATION OF ACETYLENE COPOLYMERS

[75] Inventors: Herbert Naarmann, Wattenheim; Klaus Penzien, Frankenthal, both of Fed. Rep. of Germany; Heinz G. Viehe, Louvain-la Neuve, Belgium

[73] Assignee: BASF Aktiengesellschaft, Fed. Rep. of Germany

[21] Appl. No.: 265,077

[22] Filed: May 19, 1981

Related U.S. Application Data

[62] Division of Ser. No. 174,107, Jul. 31, 1980, abandoned.

[51] Int. Cl.$^3$ ............................................. C08F 238/02
[52] U.S. Cl. ................................. 526/250; 428/421; 428/442; 428/463; 526/121; 526/122; 526/169.3; 526/285; 528/486; 528/490
[58] Field of Search .................... 526/169.3, 285, 250

[56] References Cited

U.S. PATENT DOCUMENTS

| 3,092,613 | 6/1963 | Kennerly et al. | 526/285 |
| 3,098,843 | 7/1963 | Luttinger | 526/285 |
| 3,637,611 | 1/1972 | Takeya et al. | 526/169.3 |

FOREIGN PATENT DOCUMENTS 897099  5/1962  United Kingdom ............... 526/285

OTHER PUBLICATIONS

D. J. Berets et al., Trans. Farad. Soc., 64 (1968), pp. 823–828.
H. Shirakawa, J. Chem. Soc. Comm., (1977), pp. 578–580.
Russ. Chem. Reviews, 46, No. 4 (1977), pp. 374–386.

*Primary Examiner*—Stanford M. Levin
*Attorney, Agent, or Firm*—Keil & Witherspoon

[57] ABSTRACT

Copolymers of acetylene are prepared by catalytic polymerization of mixtures of acetylene and heteroalkynes with Ziegler catalysts. The polymers may be used as pigments or as colored coatings on metal, glass or plastic.

8 Claims, No Drawings

PREPARATION OF ACETYLENE COPOLYMERS

This is a division of application Ser. No. 174,107, filed July 31, 1980, abandoned.

The present invention relates to the preparation of acetylene copolymers, by polymerizing mixtures of acetylene and heteroalkynes with organo-metallic catalysts.

The preparation of polyacetylenes by polymerization of acetylene has been disclosed, for example by D. J. Berets et al. (Trans.Farad.Soc. 64 (1968), 823 et seq.). A more recent publication by H. Shirakawa et al., J. Chem. Soc. Comm. (1977), 578, also describes the polymerization of acetylene, by means of Ziegler catalysts, to give polyacetylenes. These methods give products which are completely insoluble in conventional solvents and are obtained as black amorphous or partially crystalline materials.

It is an object of the present invention to provide a process for the preparation of acetylene copolymers which, as a result of the use of the comonomers specified according to the invention, contain heteroatoms and other functional groups.

We have found that this object is achieved by a process wherein mixtures of acetylene and heteroalkynes are polymerized.

Accordingly, the present invention relates to a process for the preparation of acetylene copolymers by catalytic copolymerization of acetylene and comonomers, with organo-metallic catalyst mixtures, wherein the comonomers are heteroalkynes.

Heteroalkynes are described, for example, in a book by H. G. Viehe "Chemistry of Acetylenes", published by J. Wiley, N.Y., U.S.A., in 1964, and in J. org. Synth. Prog. 31 (1973), 466, and in Russ. Chem. Reviews 46, No. 4 (1977), 374.

Examples of suitable comonomers to be used with acetylene are HC≡CF, HC≡CCl, HC≡CBr, HC≡CI, HC≡CCN and

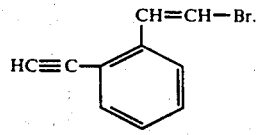

For the purposes of the present invention, the term "heteroalkyne" shall mean compounds containing a triple bond and a heteroatom such as Cl, F or Br, or a group including a heteroatom such as CN or CH₂—S—CH₃.

Diynes or enynes may be used as additional comonomers. Examples of suitable compounds are HC≡C—CH=CH₂,

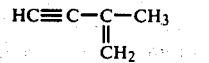

and HC≡C—CH₂—S—CH₃.

The most advantageous results are obtained by using monomer mixtures which contain up to 50 mole % of heteroalkynes, preferably from 5 to 20 mole % of heteroalkynes.

The polymerization is most advantageously carried out with Ziegler catalysts which are prepared from mixtures of aluminum trialkyls and titanium tetraalkoxides. Examples of suitable aluminum trialkyls are aluminum triethyl, aluminum triisobutyl and, preferably, aluminum trioctyl.

Amongst the titanium tetraoxyalkyls it is advantageous to use those where alkyl is of 1 to 10 carbon atoms; titanium tetraoxybutyl has proved particularly suitable. The aluminum trialkyl and titanium tetraoxyalkyl are used in a ratio of from 0.5:1 to 1:0.5, preferably of about 1:1, by weight. However, other catalyst mixtures, eg. CoCl₂, Co acetylacetonate, NiCl₂, nickel benzylacetonate or manganese(III) acetylacetonate mixed with NaBH₄ or with Al hydrides, LiAlH₄ or Al(alkyl)₂ hydride (where alkyl is preferably n-butyl) may also be employed.

The catalyst mixture is used in an amount of from 0.1 to 10 parts per 100 parts of the mixture of acetylene and other alkynes. The polymerization is advantageously carried out at from −90° to +100° C., preferably from −70° to +10° C., under a pressure of, advantageously, from 0.1 to 10 bars, preferably around 1 bar.

The polymerization may, for example, be carried out in an auxiliary liquid, for example according to the method of Shirakawa, J. Chem. Soc. Comm. (1977), page 578. Suitable liquids are those which are inert toward the polymerization catalysts and the monomers, such as aliphatic oils, aromatics, cycloaliphatics, petroleum ether or naphtha. The ratio of these liquids to the mixture of alkynes is from 1:1 to 1,000:1, preferably of the order of 10:1. The catalysts may be charged into the reaction vessel initially, together with the auxiliary liquid, and/or may be introduced continuously during the polymerization.

It is, however, also possible to polymerize the monomers in the gas phase. In that case it is advantageous to introduce, into the polymerization vessel, a carrier which may consist of previously prepared polymer in the form of a fine powder. The catalysts are then introduced as a slurry in an auxiliary liquid, and the solvents are stripped off after the polymerization has taken place.

The process gives copolymers of acetylene with other alkynes which in addition to insoluble constituents may also contain soluble constituents. The soluble constituents have molecular weights in the range of from 250 to 2,000, and in most cases of about 1,000. The molecular weights were determined by vapor pressure osmometry, using the method of Wilson, Bini and Hofstader, Anal. Chem. 33 (1961) 135–137.

The novel polymers are colored pigments which, because of their film-forming capacity, are of interest as colored coatings on metal, glass or plastic.

EXAMPLE 1

Preparation of the catalyst:

4.57 g (40 millimoles) of aluminum triethyl were first mixed with 50 ml of toluene, and 3.4 g (10 millimoles) of titanium tetraoxybutyl were then added. This solution was shaken and left to stand for about 10 minutes, during which time it assumed a blackish brown color. A syringe was used to withdraw the amounts of catalyst required and add them to the reaction batches. Copolymerization of acetylene with heteroalkynes:

In each case 40 ml of acetylene were dissolved in 50 ml of toluene in a 100 ml round-bottomed flask, giving a saturated solution. Various amounts of alkynes were then added and after mixing the batches 10 ml of the above catalyst solution were introduced into each.

After 24 hours, 20 ml of a solution of hydrochloric acid in methanol were added. The black precipitate was filtered off and washed with methanol. The results are shown in Table 1.

TABLE 1

| No. | Acetylene mg | Monomer mg | Insoluble polymer mg |
|---|---|---|---|
| 1 | 40 | 40 CH≡CCl | 73 |
| 2 | 40 | 20 CH≡CCl | 49 |
| 3 | 40 | 10 CH≡CCl | 38 |
| 4 | 40 | 40 CH≡C—CN | 79 |
| 5 | 40 | 30 CH≡CBr | 64 |
| 6 | 40 | 20 CH≡C—C$_6$H$_4$—CH=CH—Br | 59 |
| 7 | 40 | 10 HC≡C—C=CH$_2$<br>  \|<br>  CH$_3$ | 49.5 |

Preparation of a film by copolymerization:

A 500 ml vessel was evacuated and then flushed with nitrogen, after which 100 ml of toluene and 20 ml of the above catalyst solution were added. The reaction vessel was kept at −50° C. After this temperature had been reached a mixture of acetylene and bromoacetylene was applied to the surface of the liquid. When the polymerization had ended, the liquid was siphoned out of the reaction vessel. The polymer film obtained was washed and dried.

Preparation of a polymer powder:

Mixtures of acetylene and bromoacetylene were passed into toluene to prepare saturated solutions. 30 ml of a saturated toluene solution were mixed with 10 ml of the catalyst solution. The copolymer obtained after 2 hours was filtered off and washed with toluene, dried by pressing between two filter papers and then eluted for 24 hours with glacial acetic acid on a Soxhlet apparatus. A finely divided dark yellow product was obtained. This copolymer was dried in an oven at 60° C.

Precipitation of the soluble oligomers:

On pouring the toluene solution (the filtrate from the preceding experiment) into methanol, a glossy thin film which appears reddish by transmitted light forms on the surface. The film contains a copolymer in an amount equivalent to about 10% by weight of the starting monomers. Copolymerization of acetylene with varying amounts of heteroacetylene:

Varying amounts of acetylene and cyanoacetylene were polymerized in toluene, using the catalyst described above. After completion of the polymerization, the polymer was in each case precipitated with a solution of hydrochloric acid in methanol and the amounts of insoluble polymers were determined. The soluble oligomers were isolated from the toluene solution and their amounts were determined.

The results are summarized in Table 2.

TABLE 2

Copolymerization of acetylene and cyanoacetylene, in solution in 100 ml of toluene, at −10° C.

Amounts of polymerization products.

| No. | Acetylene (mg) | Cyano-acetylene (mg) | Polymer (mg) |
|---|---|---|---|
| 1 | 40 | 0.5 | 33 |
| 2 | 40 | 3 | 36 |
| 3 | 40 | 6 | 40 |
| 4 | 40 | 10 | 43 |
| 5 | 40 | 20 | 52 |
| 6 | 40 | 30 | 63 |
| 7 | 40 | 50 | 82 |
| 8 | 40 | 100 | 112 |
| 9 | 40 | 300 | 294 |

EXAMPLE 2

Copolymerization of acetylene by means of other catalyst systems 40 mg of acetylene, and the particular comonomer used, were dissolved in N-methylpyrrolidone in a 100 ml round-bottomed flask, 100 mg of a heavy metal salt and 100 mg of a reducing agent were added and the mixture was stirred for 30 minutes at −10° C. and then for 30 minutes at room temperature, these operations being carried out under very pure argon (>99.99%). The reaction solution was then worked up as described in Example 1. The results are shown in Table 3.

TABLE 3

| No. | Comonomer mg | Heavy metal salt mg | Reducing agent mg | Insoluble polymer mg |
|---|---|---|---|---|
| 1 | HC≡CCF$_3$ | 5 CoCl$_2$ | NaBH$_4$ | 43 |
| 2 | HC≡CCl | 5 Co acetylacetonate | NaBH$_4$ | 42 |
| 3 | HC≡CCl | 5 Mn(III) acetylacetonate | Al(C$_4$H$_9$)$_2$H | 44 |
| 4 | HC≡CBr | 5 NiCl$_2$ | LiAlH$_4$ | 42 |
| 5 | HC≡CCN | 5 Fe(III) acetylacetonate | NaBH$_4$ | 40.5 |
| 6 | HC≡C—C=CH$_2$<br>  \|<br>  CH$_3$ | 50 Cu(II) acetoacetic acid ester | NaBH$_4$ | 81 |
| 7 | HC≡CF | 5 Cu(II) acetylacetonate | NaBH$_4$ | 44 |
| 8 | HC≡C—CH$_2$—S—CH$_3$ | 5 Mo(III) acetylacetonate | NaBH$_4$ | 45 |
| 9 | HC≡CCl | 15 PdCl$_2$ | NaBH$_4$ | 52 |
| 10 | HC≡CBr | 10 CoCl$_2$ | AlH$_3$ | 30 |

We claim:

1. A solid copolymer of acetylene and a heteroalkyne selected from the group consisting of chloro-ethyne, bromoethyne, fluoro-ethyne, trifluoro-methyl-ethyne, 2-propynenitrile, and 3-(methylthio)-propyne-1, said copolymer being produced by polymerizing a monomer mixture of acetylene and the heteroalkyne in the presence of a Ziegler catalyst.

2. The copolymer of claim 1, wherein the Ziegler catalyst consists of a mixture of titanium tetraoxyalkyls and aluminum trialkyls.

3. The copolymer of claim 1, wherein the monomer mixture contains from 5 to 50 mole % of heteroalkyne.

4. The copolymer of claim 1, wherein the monomer mixture contains from 5 to 20 mole % of heteroalkyne.

5. The copolymer of claim 2, wherein the aluminum trialkyl is aluminum triethyl, aluminum triisobutyl or aluminum trioctyl.

6. The copolymer of claim 1, wherein the polymerization is carried out at a temperature of from −90° to 100° C.

7. The copolymer of claim 6, wherein the polymerization is carried out at a pressure of 0.1 to 10 bars.

8. The copolymer of claim 1, wherein the polymerization is carried out at a temperature of from −70° to +10° C. and a pressure of about 1 bar.

* * * * *

UNITED STATES PATENT AND TRADEMARK OFFICE
CERTIFICATE OF CORRECTION

PATENT NO. : 4,359,563
DATED : November 16, 1982
INVENTOR(S) : Herbert Naarmann, Klaus Penzien and Heinz G. Viehe It is certified that error appears in the above-identified patent and that said Letters Patent is hereby corrected as shown below:

On the title page, the following should be added:

--[30]     Foreign Application Priority Data

Aug. 18, 1979 [DE]  Fed. Rep. of Germany .... 2933523--

Signed and Sealed this

Twentieth Day of March 1984

[SEAL]

Attest:

GERALD J. MOSSINGHOFF

Attesting Officer    Commissioner of Patents and Trademarks